Feb. 14, 1967 R. J. BOEDIGHEIMER 3,304,119
SEAT BELT ADJUSTOR
Filed July 13, 1964 5 Sheets-Sheet 1
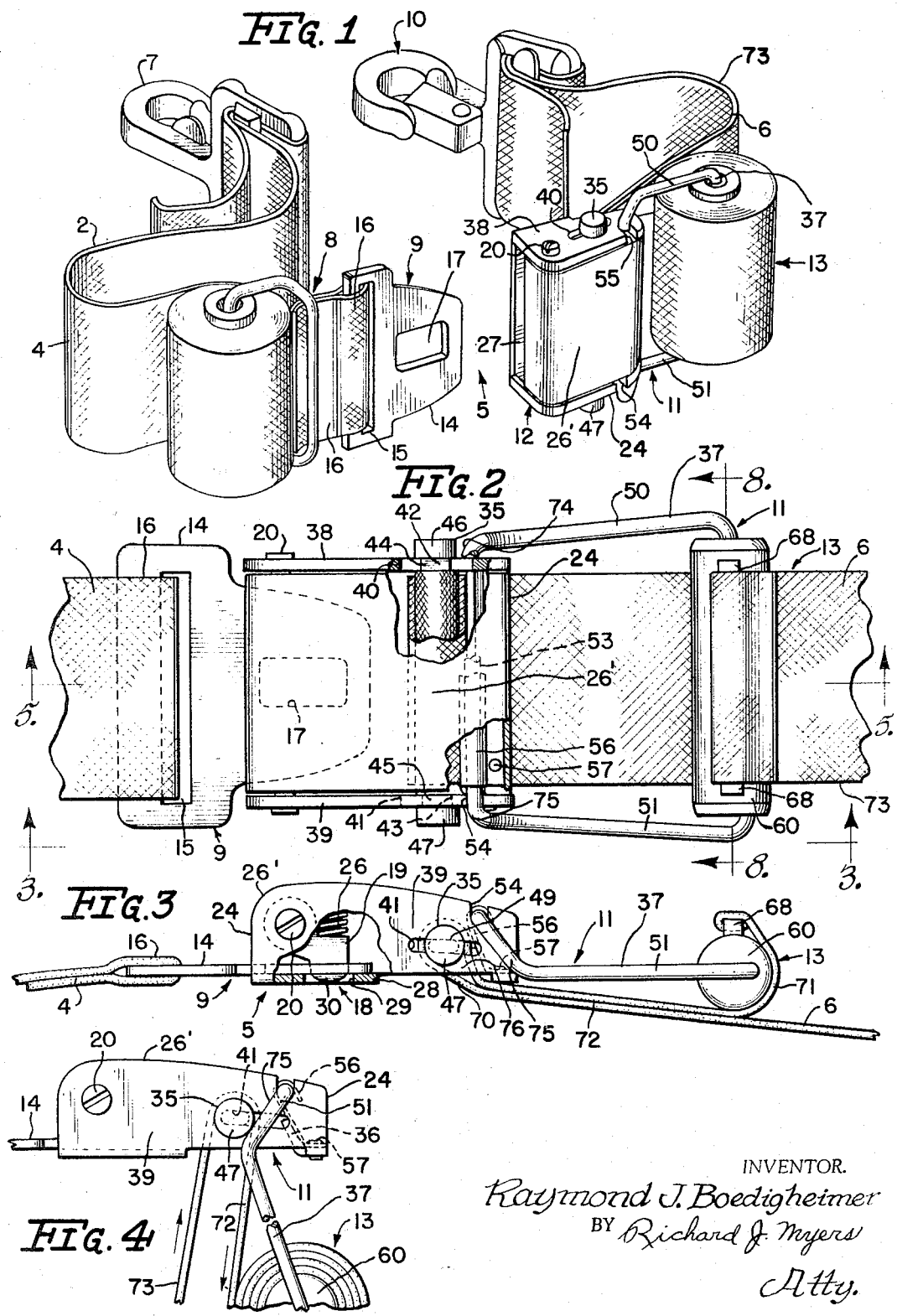
INVENTOR.
Raymond J. Boedigheimer
BY Richard J. Myers
Atty.

Feb. 14, 1967   R. J. BOEDIGHEIMER   3,304,119
SEAT BELT ADJUSTOR
Filed July 13, 1964   5 Sheets-Sheet 2
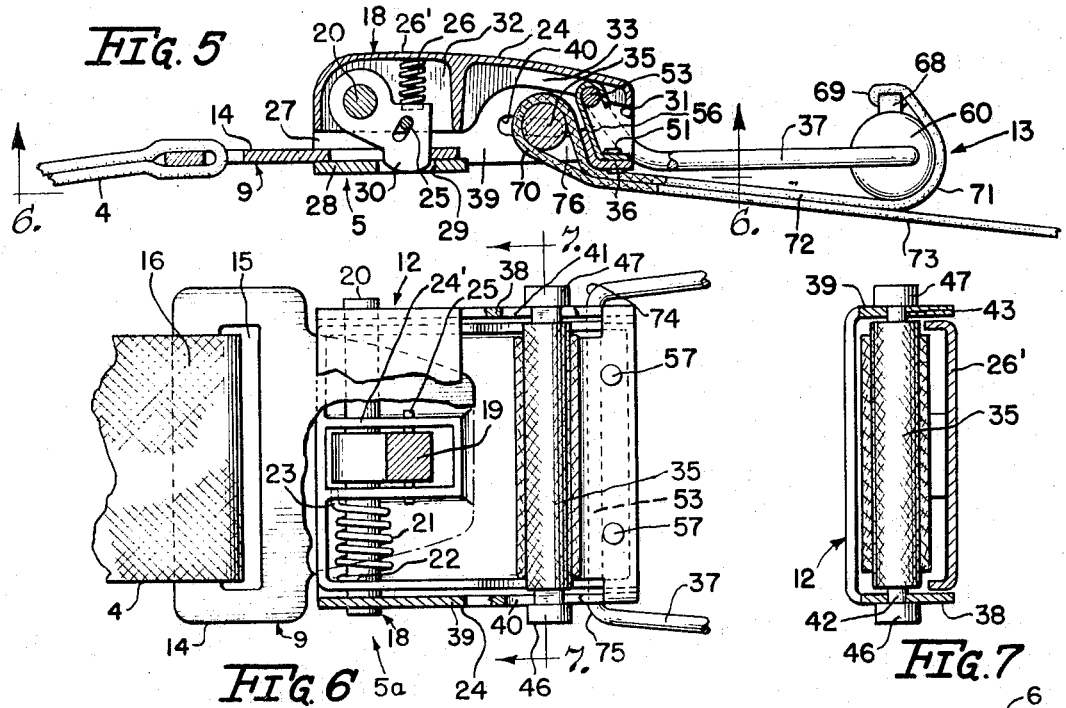
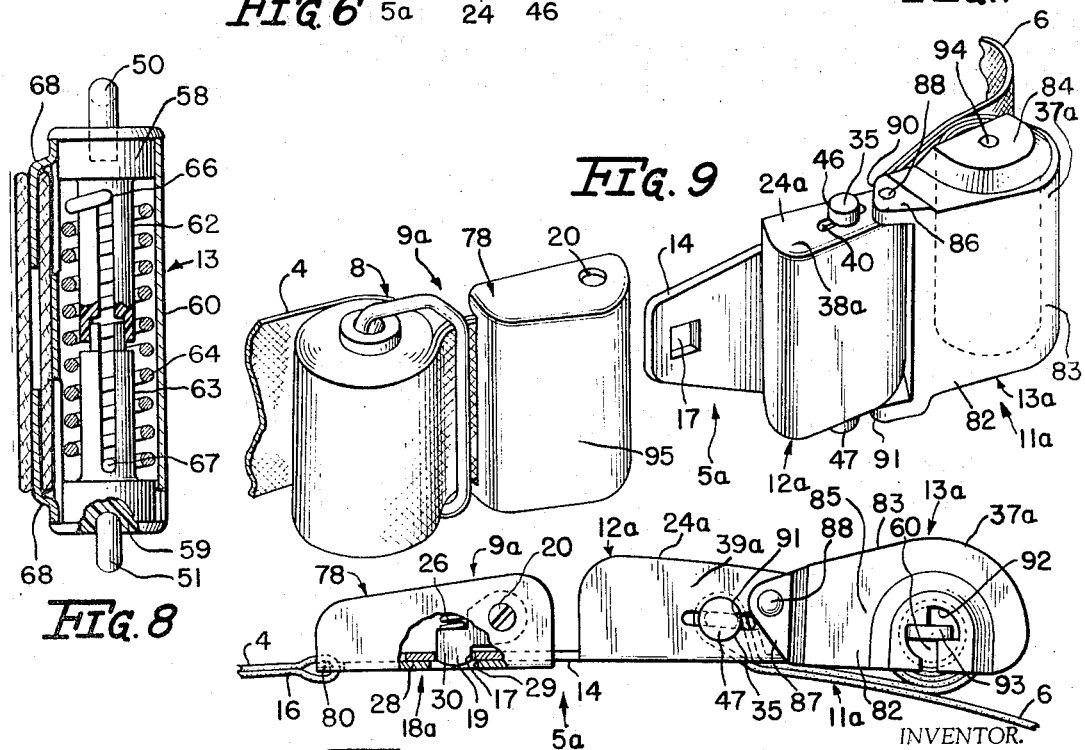
INVENTOR.
Raymond J. Boedigheimer
BY Richard J. Myers
Atty.

Feb. 14, 1967 R. J. BOEDIGHEIMER 3,304,119
SEAT BELT ADJUSTOR
Filed July 13, 1964 5 Sheets-Sheet 3

INVENTOR.
Raymond J. Boedigheimer
BY Richard J. Myers
Atty.

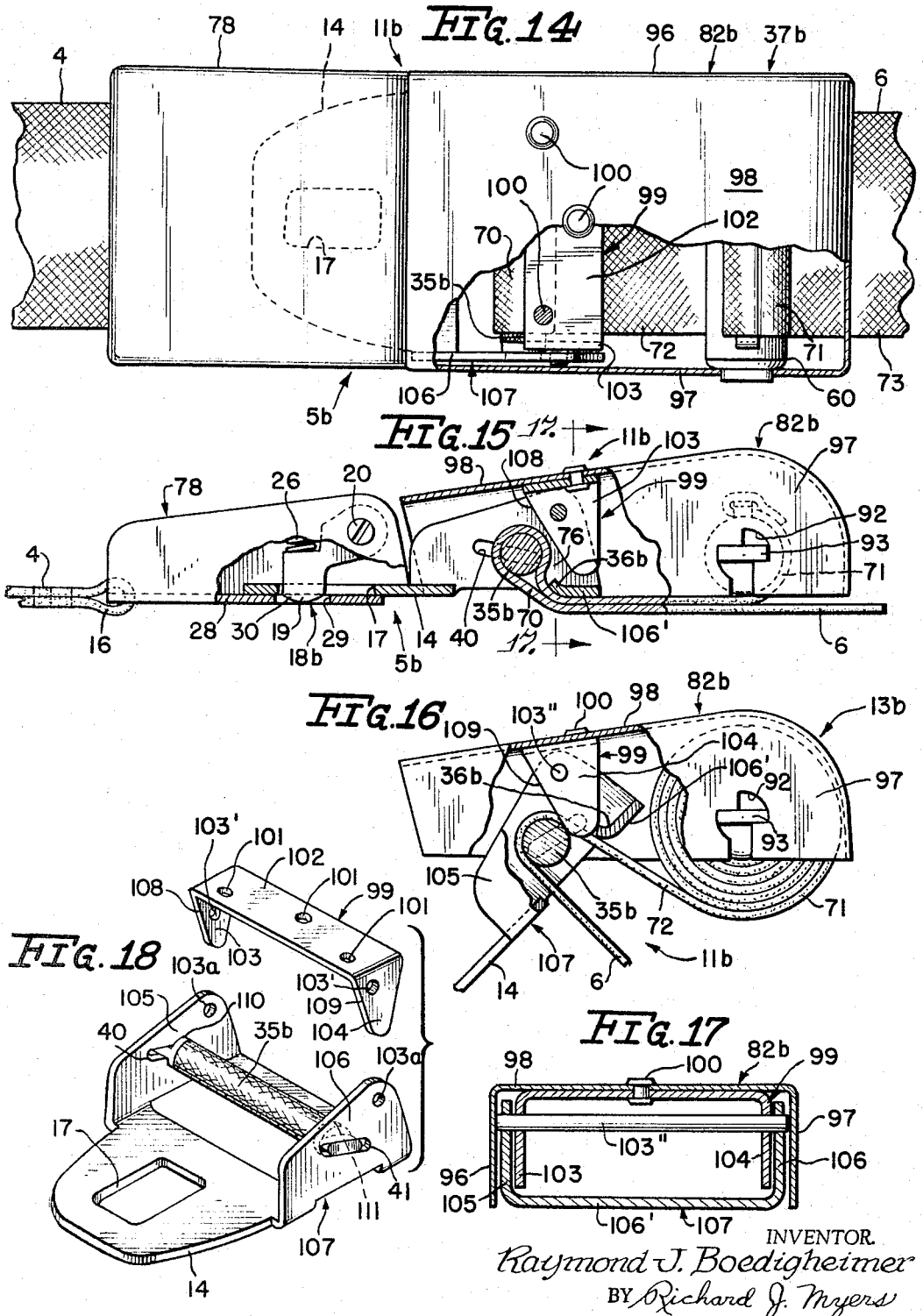

Feb. 14, 1967 R. J. BOEDIGHEIMER 3,304,119
SEAT BELT ADJUSTOR
Filed July 13, 1964 5 Sheets-Sheet 5
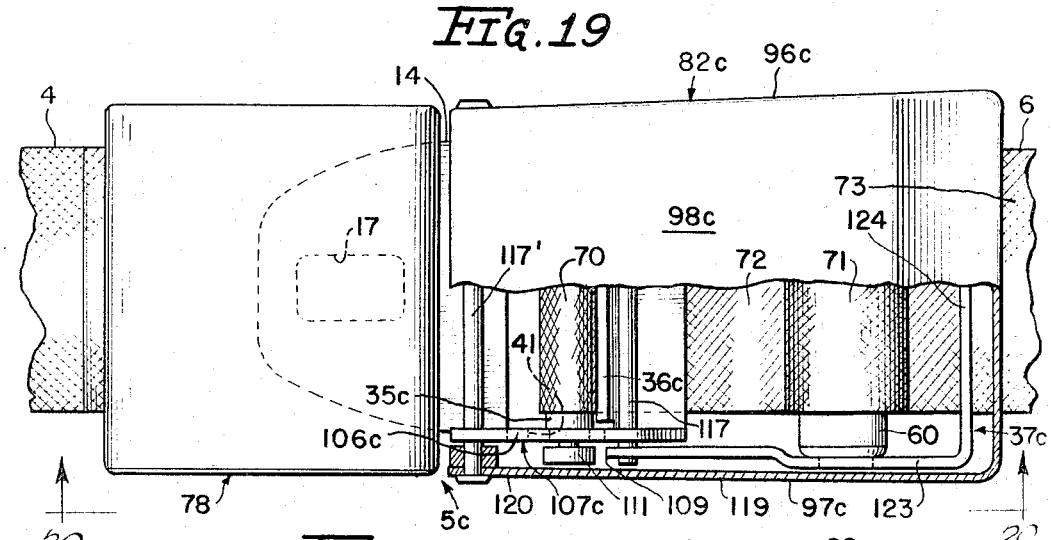
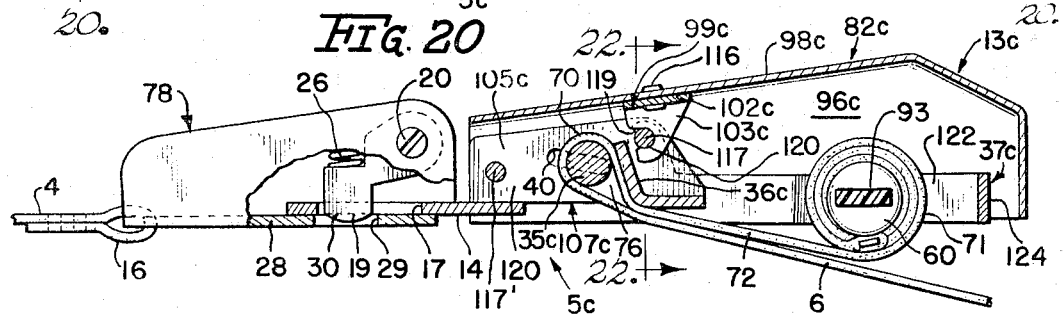
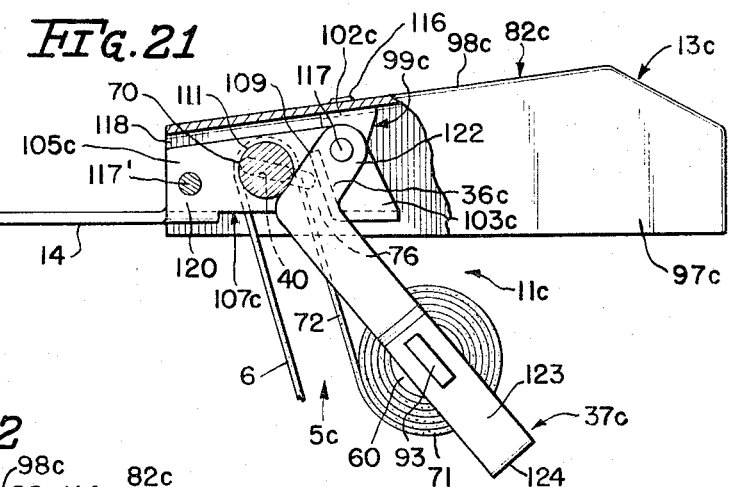
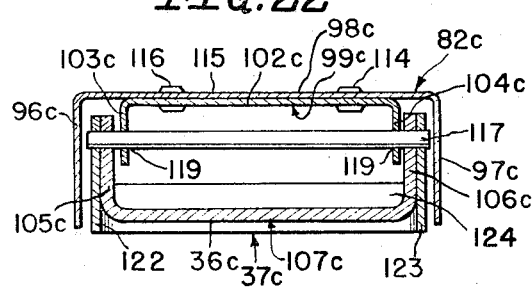
INVENTOR.
Raymond J. Boedigheimer
BY Richard J. Myers
Atty.

United States Patent Office 3,304,119
Patented Feb. 14, 1967

3,304,119
SEAT BELT ADJUSTOR
Raymond J. Boedigheimer, Chicago, Ill., assignor to Borg-Warner Corporation, Chicago, Ill., a corporation of Illinois
Filed July 13, 1964, Ser. No. 382,301
9 Claims. (Cl. 297—388)

This invention relates to a seat belt adjustor and in particular to a seat belt adjustor provided with means for varying the length of a seat belt and for storing the same.

It is therefore a general object of this invention to provide for a seat belt adjustor whereby the seat belt may be extended or contracted and held in a fixed position attendant to adjusting the same about the user or an object.

Another object of this invention is to provide a seat belt adjustor provided with means for extending and contracting the seat belt and for storing the seat belt in a safe out-of-the way place where it cannot become damaged.

A further object of this invention is to provide a seat belt adjustor provided with means for extending and contracting the length of the seat belt and further provided with means for locking the seat belt against any extension.

Another object of this invention is to provide a seat belt adjustor adapted to adjust the length of a seat belt rollable into a coil by a seat belt retractor and whereby the retractor is locked out of the line of a belt pull by a locking means.

Another object of this invention is to provide means for easily extending or contracting the retractable type of seat belt without uncoupling of the seat belt buckle.

Another object of this invention is to provide a belt retractor mechanism that is hinged or pivotally connected to the buckle for retracting the belt for easy storage purposes and yet to be an aid in extension and contraction of the belt from the waist of the user without uncoupling the belt buckle.

Another object of this invention is to provide a buckle and belt retractor unit which allows the belt to be retracted for snugness around the waist of the wearer and yet to lock out any loading on the retractor unit and on the other hand to free the belt readily from the belt locking mechanism upon pivoting of the retractor relative to the buckle whereby the length of the belt may be extended or contracted at will.

Another object of this invention is to provide a combination buckle and retractor mechanism for a vehicle safety seat belt which mechanism provides a movable locking bar means that insures positive locking of the belt about the waist of the user and yet, when desired, permits quick extension of the belt lengths away from the user by operation of the buckle locking mechanism to allow free flow of the belt which may then be extended or contracted by a retractor.

These and other objects will become apparent from our reference to the following description and appended drawings, wherein:

FIGURE 1 is a perspective view of the invention as used with a safety seat belt structure;

FIGURE 2 is a plan view of the invention;

FIGURE 3 is a view of the invention taken along line 3—3 of FIGURE 2;

FIGURE 4 is a view similar to FIGURE 3 showing the invention in a different position;

FIGURE 5 is a view taken along line 5—5 of FIGURE 2;

FIGURE 6 is a view taken along line 6—6 of FIGURE 5;

FIGURE 7 is a sectional view taken along line 7—7 of FIGURE 6;

FIGURE 8 is a sectional view taken along line 8—8 of FIGURE 2;

FIGURE 9 is a perspective view of a modification of my invention shown in FIGURES 1 through 8.

FIGURE 10 is an elevational view of my invention as shown in FIGURE 9;

FIGURE 14 is a plan view, partially in section, of still another modification of my invention;

FIGURE 15 is an elevational view, partly in section, of the embodiment shown in FIGURE 14;

FIGURE 16 is a view similar to FIGURE 15 and illustrates the embodiment in another position;

FIGURE 17 is a section taken along line 17—17 of FIGURE 15;

FIGURE 18 is an exploded perspective view of portions of the embodiment shown in FIGURES 14 through 17;

FIGURE 19 is a plan view, partly in section, of a still further embodiment of my invention;

FIGURE 20 is a view, partially in section, taken along line 20—20 of FIGURE 19;

FIGURE 21 is an elevational view of the embodiment illustrated in FIGURES 19 through 20, and illustrates another position of the portions illustrated in FIGURE 20; and FIGURE 22 is a sectional view taken along line 22—22 of FIGURE 20.

Figure 11:
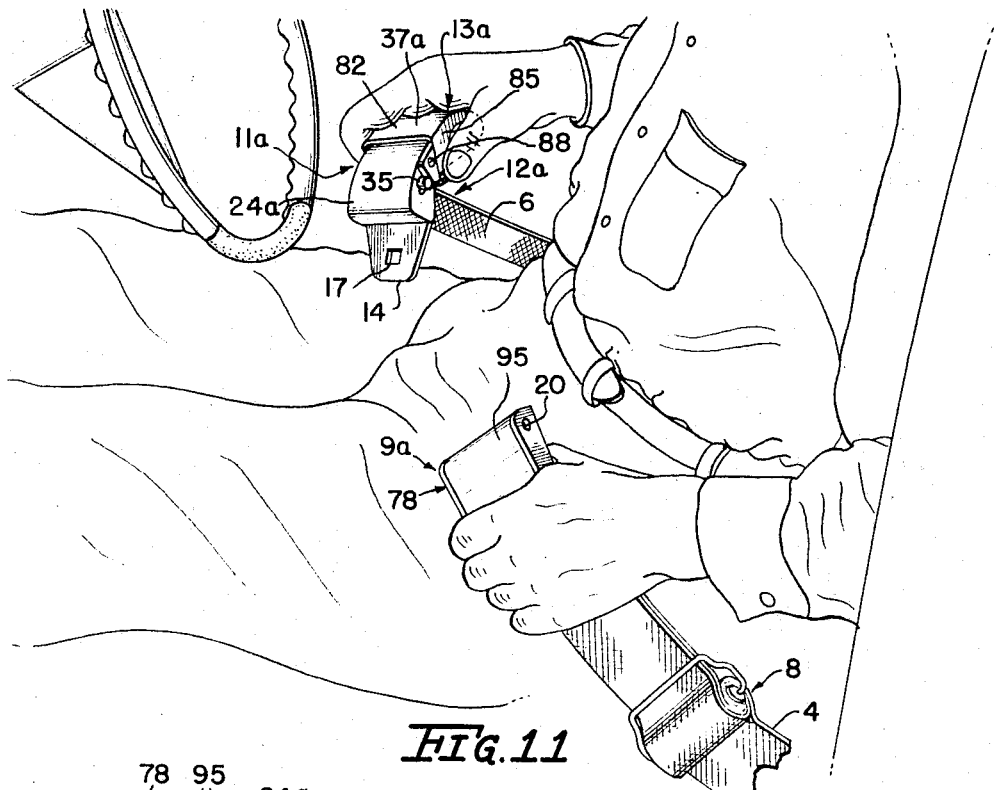
FIGURE 11 is a perspective view of the embodiment of FIGURE 9 being used about a vehicle passenger.

With reference now to the drawings, and in particular FIGURES 1 through 8, there is shown a seat belt structure 2 having a pair of connectable belt lengths 4 and 6. The belt length 4 has a floor anchorage element 7, a retractor unit 8, and a buckle or coupling element 9. The other length 6 has anchor element 10 and a belt adjustor 11 including a buckle element 12 and a retractor 13 attached thereto. The construction and operation of retractor 8 is the same as retractor 13.

The buckle element 9 is in the form of a flat plate 14 provided with a belt aperture 15, at one end, for receiving sewn loop 16 of the belt length 4. The other end of the plate 14 is provided with a latch receiving opening 17. The buckle element 12 is provided with a latch structure or couple member 18, including latch element 19 having one end pivotally mounted on pin 20. A spring 21 has its one end 22 connected to pin 20, and its other end 23 connected with the housing 24' containing the latch member 19. The latch member 19 is held in the housing 24' by pin 25, and is urged out of the housing by spring 26 connected to it. The buckle element 12 has a top cover 26' to which is attached the housing 24 and is pivotally mounted on the pivot pin 20. The buckle plate 14 may be inserted through opening 27 in the buckle element 12 along plate 28. Plate 28 has an aperture 29 through which extends the nub 30 of the latch element 19. The nub 30 also extends through the aperture 17 of the buckle plate 14 for coupling the buckle element 9 with the buckle element 12. These parts 14 and 12 may be released from one another by raising buckle cover 26' at its end 31. It will be appreciated that the latch structure 18 including its associated cover plate 26' may take other forms.

The buckle element 12 is composed generally of two areas 32 and 33 of housing 24, the area 32 having the latch mechanism 18 and the area 33 having a portion of the belt adjustor 11 in the form of a knurled locking bar or pin 35 and the upright member or locking element 36 and a portion of the reaction member 37 of the retractor 13. Each of the side walls 38 and 39 of the buckle element 12 is provided with a respective elongated horizontally extending slot 40 and 41 for receiving a respective part 42 and 43 of the ends 44, 45 of the locking bar pin 35. The end 44 has an enlarged outer portion in the form of a cam element 46, and the end 45 has an enlarged outer portion in the form of a cam element 47. These cam elements 46 and 47 are located externally of the walls 38 and 39, the parts 42 and 43 being free to move in the slightly upwardly sloping generally horizontal slots 40 and 41 for carrying the locking bar 35 in a to and fro horizontal direction. The locking bar 35 is prevented from moving in a vertical direction by the flat side of the parts 42 and 43 engaging elongated slots 40 and 41.

The reaction member 37 of the retractor unit 13 has a pair of longitudinally extending side arms 50 and 51 that join with a transverse or cross arm 53 journalled in open end slots 54, 55 in the side walls 38 and 39 respectively. Hook member 56 is held on the bottom wall portions by bolts 57 to hold the cross arm 53 to the buckle element 12. By this arrangement the reaction arm 37 is allowed to pivot with respect to the buckle element 12. The arms 50 and 51 join with respective retractor end plugs 58 and 59. The arm 50 is allowed to rotate in the anchor plug 58 whereas the arm 51 is fixedly attached to the driver plug 59. The end plugs 58 and 59 are received within the hollow reel 60 of the retractor unit 13. The end plug 58 is fixedly attached to the reel whereas the end plug 59 is allowed to rotate with respect to the reel. The internal extension 62 of the plug 58 is rotatively mounted with respect to the internal portion 63 of the plug 59 and a spring 64 encircles both of the extensions 62 and 63; the end 66 of the spring 64 being connected with the plug extension 62 and the end 67 of the spring 64 being connected with the plug extension 63. A clamp structure or grip member 68 is mounted on the outer periphery of the reel 60 and holds one end 69 of the belt length 6 fixed to the retractor unit 13. A belt portion 70 of the belt length 6 is in the form of a loop about the locking bar on pin 35, the belt length 6 extending rearwardly to the anchor structure 10.

The retractor unit 13 is under a spring load and rolls the belt length 6 into a coiled portion 71 about the reel 60, a belt length portion 72 joining coiled portion 71 with the belt portion 70. With reference now to FIGURES 3 and 5, it is seen that the belt lengths 4 and 6 lie in a generally horizontal plane, when placed about the waist of a user, with the buckle elements 9, 12 lying generally in the same horizontal plane. In this position the locking bar 35 is moved to the right so that the looped belt portion is tightly pressed between the locking bar and the upright member or fixed abutment 36. The loop 70 is held tightly fixed in this position so that the portions 70, 71 and 72 of the belt length 6 are immobilized, the length 72 being in tension due to the spring loaded condition of the retractor unit 13. Good locking action of the belt portion 70 is aided by locating the upright member 36 slightly below the locking bar 35. This locking action is further aided by the shape of the upright or gripping member 36 as it is seen, it is in the form of a L-shaped element with the loop 70 being bent about the L-shaped element. The remaining portion 73 of the belt length extends back tautly to the floor anchor 10 as does the belt length 4 to anchor element 7. When it is desired to release the tight loading of the belt lengths and buckle elements of the buckle from the waist of the user, the retractor element may be gripped by the hand and raised or pivoted transversely to the buckle element 12 as shown in FIGURE 4. This movement urges the side bars 50 and 51 of the reaction member 37 to have the surfaces of the cam or upright members 74 and 75 engage with the cam engaging surfaces of the exterior extensions 46 and 47 of the locking bar 35. The locking bar 35 is thus urged to the left, as seen in FIGURE 3 or 5, along the slots 40 and 41 to a position where the locking bar is at the extreme left side of the slots 40 and 41. In this latter position the space or belt passage 76 between the locking bar 35 and the upright member or jaw 36 is enlarged, permitting free flow of the belt portion 70, 71 and 72 therethrough. This allows the user to increase or decrease the belt length 6, and therefore the total length of the belt 2, by the coiling or uncoiling of the belt length 71 about the retractor unit 13. Also in this latter position it will be noted that the belt length 72 is held straight between the bar or jaw 35 and the bar or jaw 36 and is no longer bent about the L-shaped member 36. The arm portions 74 and 75 by engaging with the locking bar portions 46 and 47, aid or act in conjunction with the swinging action of the reaction member 37 and the ability of the retraction unit 38 to maintain the belt length 72 in a taut condition, to swing the belt length 72 and consequently the locking bar 35 away from the upright member or jaw element 36. This allows free movement of the belt through the enlarged space or belt passage 76. This taut condition or tensioning of the belt portion between the retractor 38 and the locking pin 35 is attributable to the interconnection between the reaction arm that is pivotally mounted on the buckle element 12 and the spring and the reel tending to roll the belt portion into a coil.

It will be noted that the belt length 4 also has a retractor unit 8 on it, identical to the retractor unit 13 on the belt 6. However, the reaction arm 37 of unit 8 is not attached to buckle element 9 or 12 of the buckle 5.

Another modification of the invention is illustrated by the FIGURES 9 through 13, wherein there is shown a belt adjustor 11a in the form of a combination buckle and retractor structure adapted for coupling with a latch mechanism 18a. Those elements of this second modification that are similar to the invention as shown in FIGURES 1 through 8, will have the same reference characters as the embodiment shown in FIGURES 1 through 8. That is, there is shown in FIGURES 9 through 13, a latch mechanism 18a which in this instance however, is within a buckle element housing 78 of a buckle element 9a. Housing 78 is provided with an end bar 80 for coupling thereto the sewn end 16 of belt length 4. The buckle flat plate or tongue 14 is an integral part of the housing 24a which stores only the knurled locking bar 35. The belt length 4 is rolled into a coil about a retractor unit 8 and the belt length 6 is coiled about a retractor unit 13a. The retractor unit 13a differs from the unit 13 in that the reaction member 37a is in the form of a structure or housing 82 that substantially encases the reel 60 and the coiled length 71 of the belt 6. It is seen that the reaction housing 82 is provided with a roof 83, and a pair of side walls 84 and 85. Each side wall 84 and 85 has an extension arm or cam 86 or 87 pivotally connected to respective side walls 38a or 39a of the unit 24a by means of pivot pin means 88. The cam members 86 and 87 are respectively provided with cam surfaces 90 and 91, engageable with the exterior extension or projections 46 and 47 respectively, for movement of the locking bar 35 in the slots 40 and 41 in a fashion similar to that described in the disclosure of the first embodiment. The side wall 85 is provided with an open end, generally hour glass shaped, aperture 92 constructed for engagement with an extension 93 formed on the conventional end plug 59. Extension 62 of the plug 58 is rotatably mounted with respect to pin 94 in side 84. Operation of the retractor 13a is similar to the operation of the retractor 13 as disclosed in the first embodiment.

Figure 12:
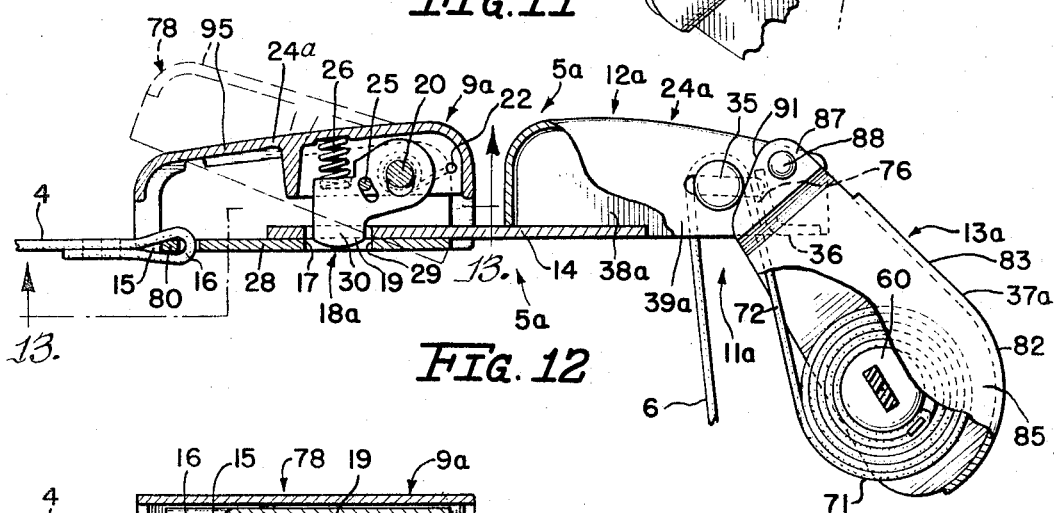
FIGURE 12 is a view similar to FIGURE 10 and showing the embodiment partially in section with the buckle and retractor structure in another position.
Figure 13:
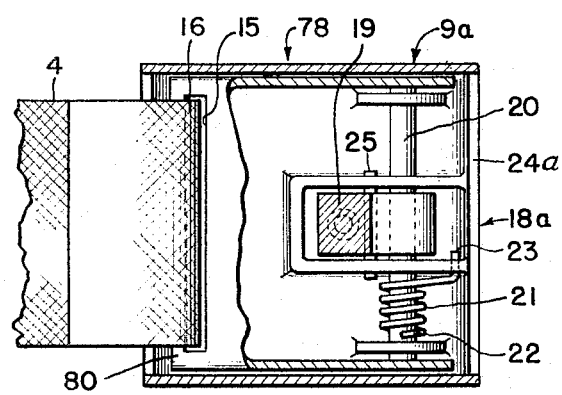
FIGURE 13 is a sectional view taken along line 13—13 of FIGURE 12.

The buckle element housing 78 is provided with a hinged roof 95 pivoted about the pin 20, allowing the roof or cover 95 to be swung upwardly, as shown in FIGURE 12, for disengagement of the latch structure 18a and the removal of the buckle tongue 14 therefrom.

As illustrated in FIGURES 11 and 12, the construction of the belt adjustor 11a permits the operator to grasp the reaction member or housing 37a, to swing it downwardly for engagement of locking bar extension 46, 47 with the cam faces 90 and 91. This release of the belt loop length 70 and the belt length 72 for extension from and contraction around the reel 60. Belt lengths 70 and 72 lie parallel to and disposed from the abutment or upright member 36 for free movement of the belt length 70 and 72 in the space or belt passage 76 in the manner described in the first embodiment of FIGURES 1 through 8.

With respect to FIGURES 14 through 18, there is shown a third embodiment of the belt adjustor 11b in the form of a combination buckle and retractor structure adapted for coupling with a latch mechanism. Those elements of this third modification that are similar to the invention shown in FIGURES 1 through 8 and FIGURES 9 through 13 will have the same reference characters as the embodiments shown in FIGURES 1 through 13. That is, there is shown, in FIGURES 14 through 18, a latch mechanism 18b which in this instance assimilates the latch mechanism 18a shown in the second embodiment and is stored within the buckle element housing 78.

The belt length 6 is rolled into a coil about a retractor unit 13b differing from the unit 13a in that the locking bar or pin 35b does not have portions extending outwardly of the side walls 96 and 97 of the housing 82b. Reaction member 37b is in the form of a structure and housing 82b that substantially encases the reel 60 and coiled length 71 of belt 6. The housing 82b is provided with the usual tongue plate 14 and with a fixed top wall 98 from which depends the U-shaped internal support or cam engaging mechanism 99. Bolts 100, extending through apertures 101 in the upper cross part 102, secure cam engaging means 99 to top cover 98. Side member arms or cams 103 and 104 extend from cross part 102 for pivotally connecting the locking bar structure 107 with respect to the cam structure 99. This pivotal connection includes aperture means 103', a pin or bar 103", and aperture 103a, connecting cam structure 99 with side walls 105, 106 and bottom wall 106' of locking bar carriage 107. The side walls 105, 106 are provided with the usual elongated slots 40, 41, receiving the locking bar 35b for sliding movement of the bar or pin 35b within the limits provided by the slots 40, 41 in a manner shown by the previous embodiments. The cam members 103, 104 are provided with cam surfaces 108 and 109 which engage with surfaces 110, 111 of the knurled locking bar 35b. It is noted that the cam surfaces 108 and 109 are located within the upright walls or side members 105 and 106 which are located within the cover or housing side walls 96 and 97. By this third embodiment, the knurled bar 35b and the cam surfaces 110, 111 are located internally within the housing 82b and not exposed where they can pinch the user or get tangled with his clothes. The bottom wall 106' carries upturned jaw element or abutment 36b assimilating member 36 of the earlier embodiments to provide the usual passage 76 for the aforementioned movement of belt portions 70, 71, 72.

The operation of the belt adjuster unit 11b of the third embodiment is of the manner as described in the first and second embodiment and may be operated in the fashion as disclosed in FIGURE 11.

Still another modification of the invention is illustrated by FIGURES 19 through 22 and is similar to the third modification, shown in FIGURES 14 through 18, except that the locking bar structure or carriage 107c of the belt adjustor 11c is fixedly attached to the housing 82c. Arms 102c, 103c, 104c of attaching means 99c is fastened to roof 98c of housing 82c by bolts 114 and 116. Transverse pins 117, 117' extend through openings in the side walls 105c and 106c to secure the locking bar structure 107c with housing 82c. The jaw member 36c forms an integral part of the structure 107c. The locking bar structure 107c is fixedly assembled to the housing by inserting pin 117 through the side members 105c, 106c of the locking bar structure 107c; then engaging the pin 117 with the open end slots 119 in the arms 103c, 104c; and then inserting the pin 117' through the forward end 120 of the side walls of the locking bar structure 107c and the side walls 96c and 97c of the housing 82c. The reaction arm structure 37c is pivotally mounted to the pin 117 through its arms 122 and 123 connecting with cross member 124. The reel extension means 93 of reel 60 is connected to arms 122, 123 for winding of the retractor spring 64 in a similar manner as disclosed in the earlier embodiments. Thus it is seen, in referring to FIGURE 20, the reaction arm 37c is in a horizontally locked or up position, and in FIGURE 21 after pivotally swinging the unit 37c relatively transversely away from the housing 82c, the reaction unit 37c extends in a downward or free belt moving position. The operation of this adjustor 11c is such that the housing 82c is grasped in the hand and the retractor unit 37c is allowed to swing away from the former in order to release the belt portion 70 from the locked position shown in FIGURE 20 to the unlocked or free flowing position shown in FIGURE 21. The arms 122 and 123 of the reaction member have the usual cam surfaces or means 108 and 109 for engaging with cammed receiving faces 110 and 111 of the knurled locking bar 35c for moving the knurled locking pin 35c away from the jaw or upright abutment 36c as aforesaid in the other embodiments. As in the case with the third embodiment, the cam faces 108, 109 and the cam engaging faces 110, 111 are located internally of the said walls 96c, 97c of the housing 82c but are also external to the side walls 105c, 106c of the fixed locking bar carriage 107c which are external to the supporting arms 103c, 104c connected to the top 98c of the housing 82c. By the arrangement shown in the fourth embodiment the cam surfaces 108, 109 and the cam receiving surfaces 110, 111 are located protectively internally of the housing 82c.

In describing principal structural parts of one embodiment having similar functional and structural characteristics to another embodiment, an alphabetical subscript has been employed. For example, the adjustor in the first embodiment has been referred to as 11, in the second embodiment as 11a, in the third embodiment as 11b, in the fourth embodiment as 11c. This has been done merely as an aid in the understanding of the invention disclosed. Similarly, such terms as horizontal, top or bottom are used in an explanatory sense. It will also be appreciated that whether the adjustor is in the locked or unlocked position the belt coil 71 may have an amount of individual coil layers around the reel 60 that differ from that shown to meet various operational conditions.

Though particular embodiments of the invention have been described and illustrated, it is apparent that modifications and alterations may be made thereon. It is therefore the intention of the appended claims to cover all subject modifications and alterations as may fall within the true spirit and scope of the invention.

What is claimed is:

1. The combination of a buckle and retractor for a seat belt comprising a buckle having a seat belt locking structure for adjusting a belt length in a first fixed and a second belt releasing position, a seat belt retractor of the reel type for mounting on the belt length and adaptable to coil said length about the reel portion of the retractor in superimposed coiled layers by the winding action of the energy storing means of the retractor, said belt locking structure comprising a locking element and slot means in the buckle receiving portions of the locking element and allowing movement of the locking element relative to the buckle, a belt abutment mounted on the buckle in fixed relation to said slot means and defining with the locking element a belt path, said element being provided with surface for receiving a looped portion of the belt length connectable with the belt coil about the reel, said retractor having a reaction member pivotally connected with the buckle for swinging movement of the retractor from a first position generally in the plane of the buckle to a second position in a plane transverse to the plane of the buckle, said reaction member having cam surfaces and said locking element having surfaces engageable with surfaces of the reaction member and movable away from the buckle abutment upon engagement of the reaction member surfaces with the locking element surfaces whereby in the first position of the retractor the locking element presses against the belt length for locking the belt against the buckle abutment and in the second position of the retractor the belt path is enlarged by the movement of the element away from the buckle abutment.

2. The invention according to claim 1 whereby the seat buckle abutment is provided with an upward extending arm in alignment with the locking element and wherein said arm extends diagonally upward and toward said locking element and wherein said cam surfaces are generally parallel to said abutment arm in said first position.

3. The invention according to claim 1 and said abutment comprising an arm portion extending diagonally upward toward the locking element and below said locking element in said first position to provide for a belt path that is reversed upon itself for effective locking action.

4. A belt adjustor arrangement for seat belts comprising a retractor having a reel, a winding spring means within the reel, and a reaction member having a driving connection with the winding spring means and the reel whereby said reel is adapted to wind and carry a seat belt in coiled relation thereabout, a buckle having a moveable belt locking means for receiving a portion of the belt for connection with the belt coil about the reel, a belt abutment carried by the buckle and spaced away from said locking means and providing a belt passage for that portion of the belt about the locking means and connected with the reel, slot means in the buckle and extension means on said locking means slidingly received in said slot means, said reaction member being pivotally connected with said buckle and being provided with cam surface means engageable with said locking means for moving said locking means from a first position wherein said locking means and said buckle abutment tightly grasps the belt, to a second position wherein said locking means is positioned away from said buckle abutment for allowing freedom of movement of the belt through the passage.

5. The invention according to claim 4 in which said buckle includes a pair of buckle walls defining said slot means, said locking means having cam engaging surfaces disposed externally of said buckle walls and said reaction member comprising a pair of lateral arms defining said cam surfaces and mounted externally of and on said buckle walls.

6. The invention according to claim 4 in which said reaction member comprises a housing at least partially enclosing the reel and having internal cam surfaces, said locking means having surfaces within the housing for engagement with the cam surfaces of the housing.

7. A belt adjustor for a vehicle safety seat belt comprising: a seat belt buckle; belt locking means including a locking pin mounted transversely on the buckle defining a belt passage adapted to receive the loop of a safety belt in gripping relation, said locking pin having portions defining cam engaging means; a belt adjusting means pivotally mounted on said buckle and provided with means for storing the belt including a resiliently loaded belt roll-up reel means adapted to receive the free end portion of the belt and hold same in a coiled condition, said adjusting means also being provided with operating means engageable with said belt locking means for increasing the size of said belt passage, said operating means including a belt reaction member pivotally connected with the reel means attendent to holding the belt loop taut, said reaction member comprising a housing enclosing at least partly the said cam engaging means and the reel and having internally downwardly extending reaction arm means defining cam means; wherein said adjusting means is swingable from a first position where said belt locking means tightly grips the belt loop, to a second position wherein said operating means engages with said belt locking means to provide an enlargement of the belt passage attendent to free flow of the belt through said belt locking means.

8. The invention according to claim 7 in which said operating means comprises a housing provided with arm means defining cam means, said locking means comprising a locking pin and another housing having sidewall means defining slot means receiving said locking pin, and said locking pin having portions external of said sidewall means and defining cam engaging means for contacting said cam means, said arm means being mounted on said sidewall means externally of said another housing.

9. The invention according to claim 7 in which said locking means comprises a locking pin and a housing having internal wall means defining slot means receiving the locking pin, said locking pin having portions within said housing defining cam engaging means, said operating means having arm means pivotally mounted within said housing and defining cam means for contacting with said cam engaging means.

References Cited by the Examiner

UNITED STATES PATENTS

| 2,822,595 | 2/1958 | Ruhl | 24—170 |
| 3,214,814 | 11/1965 | Carter et al. | 24—196 |
| 3,226,791 | 1/1966 | Carter | 297—388 |
| 3,227,489 | 1/1966 | Stubblefield | 297—388 |

FRANK B. SHERRY, *Primary Examiner.*

CASMIR A. NUNBERG, *Examiner.*